(12) United States Patent
Beaulieu et al.

(10) Patent No.: US 6,474,747 B2
(45) Date of Patent: Nov. 5, 2002

(54) SPLIT BOOM COUPLING STRUCTURE

(75) Inventors: Kevin F. Beaulieu, Charlotte, NC (US); Mang Lim Ngo, Charlotte, NC (US)

(73) Assignee: Homelite Technologies Limited, Hamilton (BM)

( * ) Notice: Subject to any disclaimer, the term of this patent is extended or adjusted under 35 U.S.C. 154(b) by 0 days.

(21) Appl. No.: 09/727,137

(22) Filed: Nov. 30, 2000

(65) Prior Publication Data

US 2002/0064421 A1 May 30, 2002

(51) Int. Cl.$^7$ ................................................ B26B 27/00
(52) U.S. Cl. ...................... 301/296.1; 30/276; 403/377; 403/337; 403/344
(58) Field of Search ............................... 403/11, 13, 14, 403/335, 7, 8, 377, 109.1, 5, 6, 344; 172/13, 14; 371/246; 561/249, 255, 256, 12.7; 30/264, 277.4, 276, 296.1

(56) References Cited

U.S. PATENT DOCUMENTS

| | | | | |
|---|---|---|---|---|
| 4,463,498 A | * | 8/1984 | Everts | 30/296 |
| 4,733,471 A | * | 3/1988 | Rahe | 30/276 |
| 4,753,462 A | * | 6/1988 | Liu | 285/420 |
| 4,899,446 A | * | 2/1990 | Akiba et al. | 30/276 |
| 5,570,737 A | | 11/1996 | Tokutake | 165/67 |
| 5,802,724 A | * | 9/1998 | Rickard et al. | 30/296.1 |
| 6,199,921 B1 | * | 3/2001 | Cassel et al. | 285/424 |

* cited by examiner

Primary Examiner—Lynne H. Browne
Assistant Examiner—Michael P Ferguson
(74) Attorney, Agent, or Firm—Harrington & Smith, LLP

(57) ABSTRACT

A coupling structure for a split boom power tool is provided. The structure permits any of a variety of lower tubular boom members with their working tools to be quickly and easily coupled to or uncoupled from an upper tubular boom member having a power source. The structure includes compatibly sized end portions on the upper and lower boom members that allow them to be quickly and easily telescopically joined and also provide a strengthened joint. A clamping member is provided with a locating tab that is receivable in a locating hole in the tube of the upper boom member to allow the clamp to be quickly and positively positioned at the joint. A plurality of tool orienting openings are provided in the end portion of the upper boom member and clamp to receive a spring loaded locking pin carried in the lower boom member to position the tool at a desired angular working orientation. The locating tab further serves to align the tool orienting openings in the clamp and upper boom member as the clamp is positioned on the upper boom member.

11 Claims, 5 Drawing Sheets

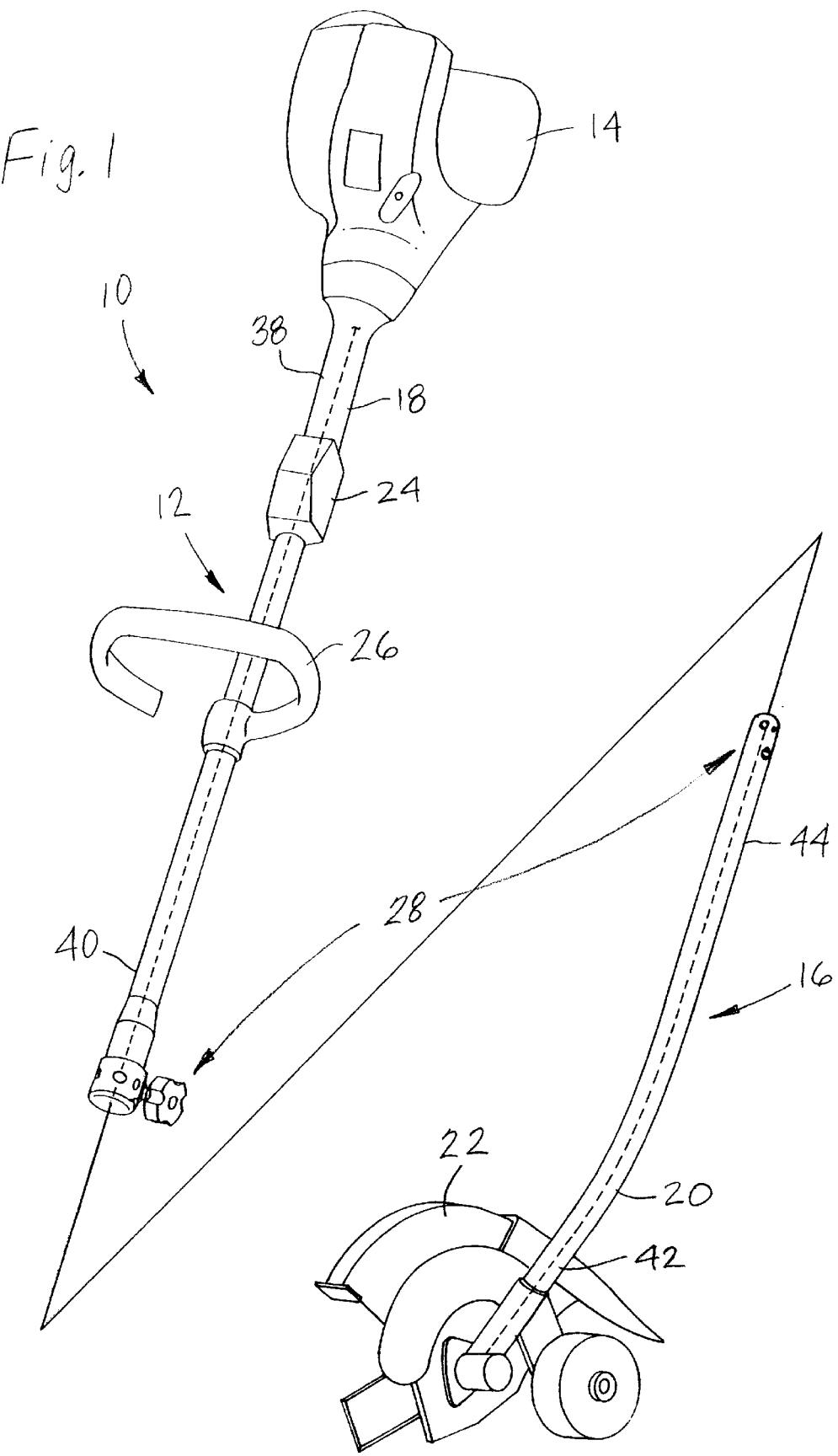

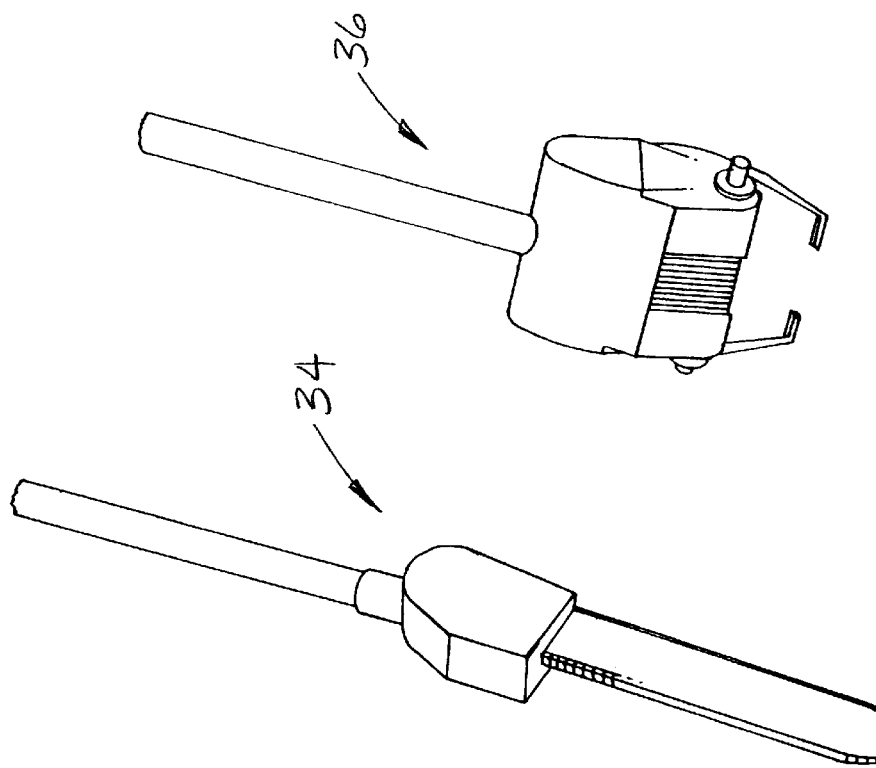
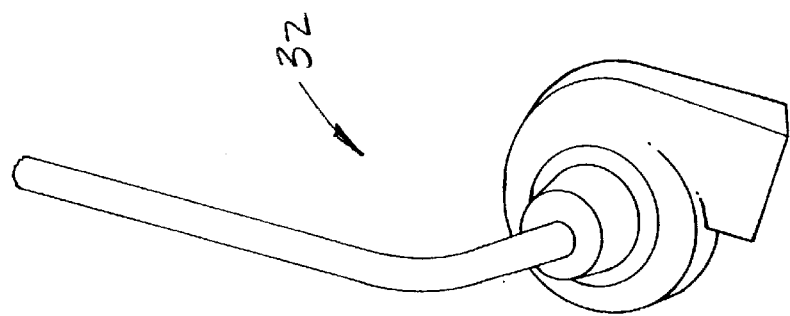
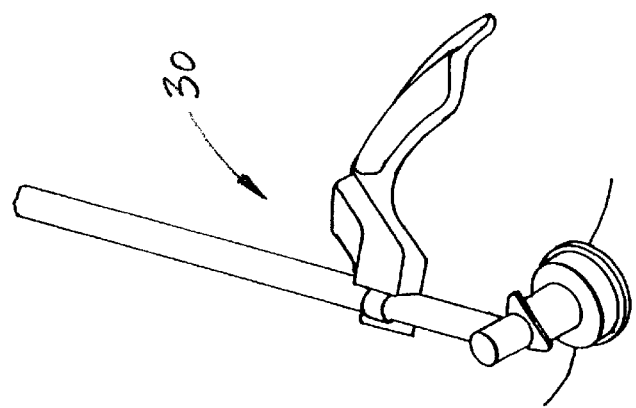

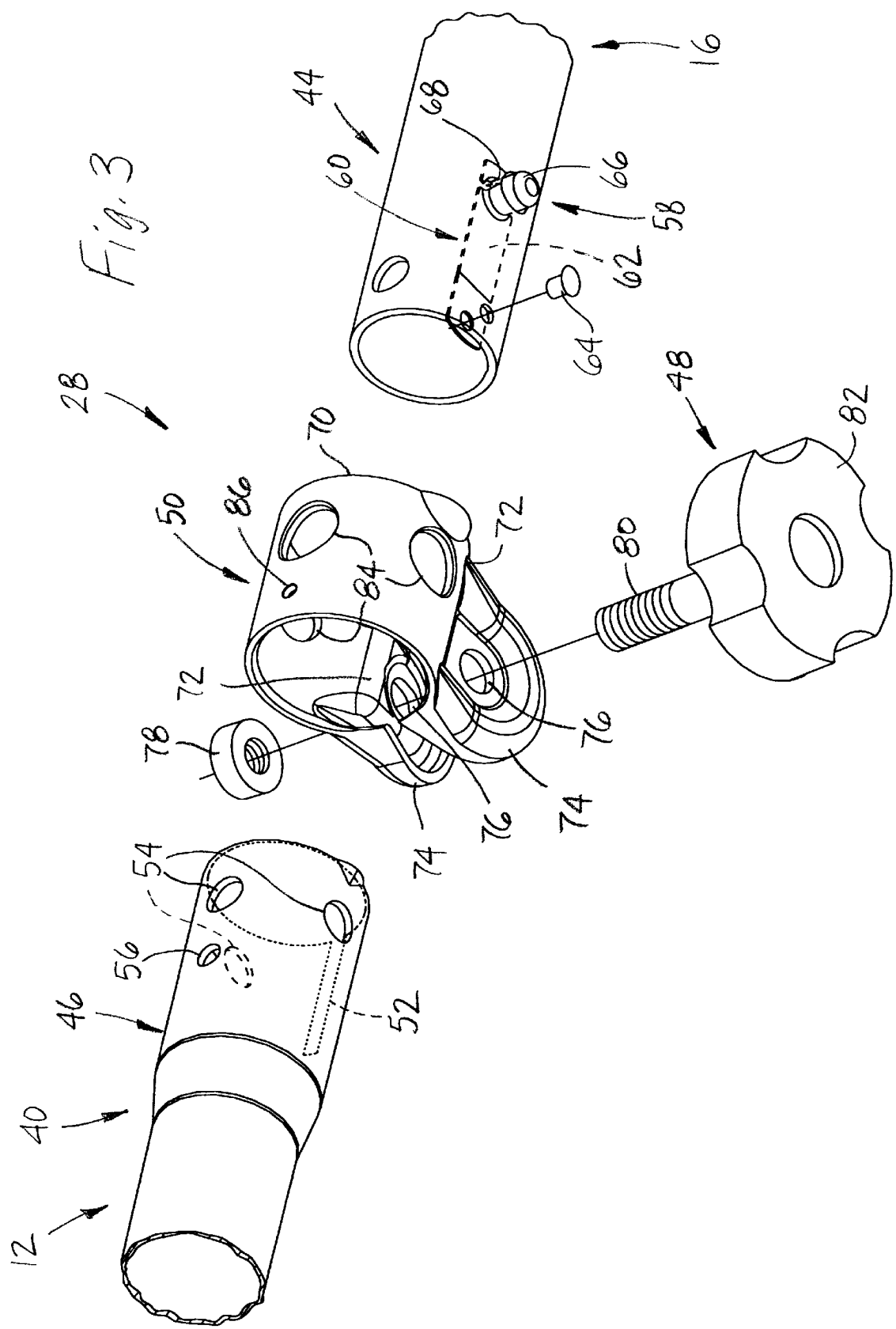

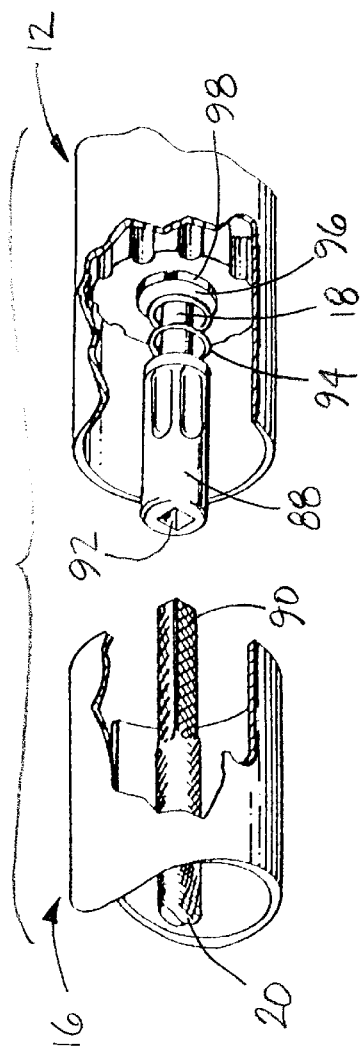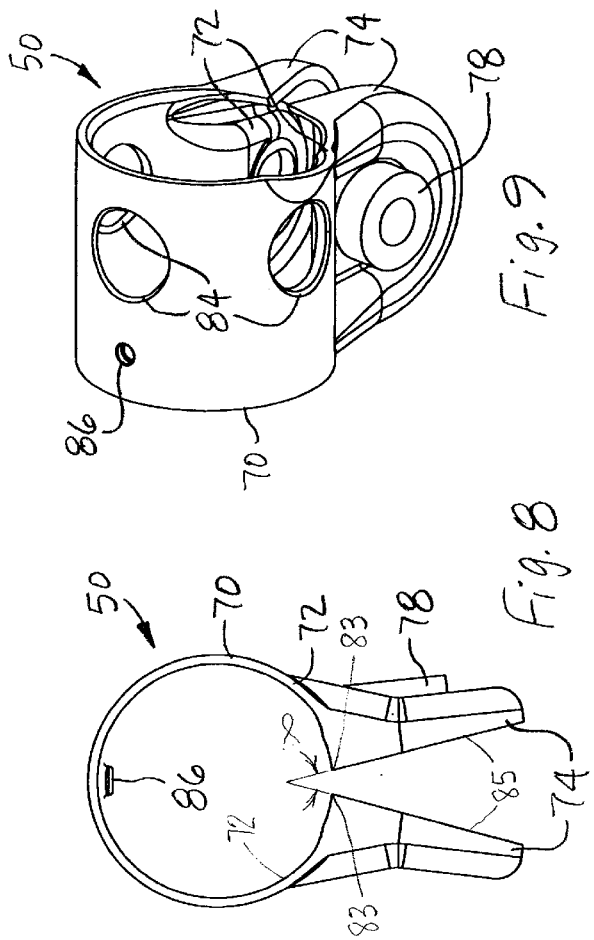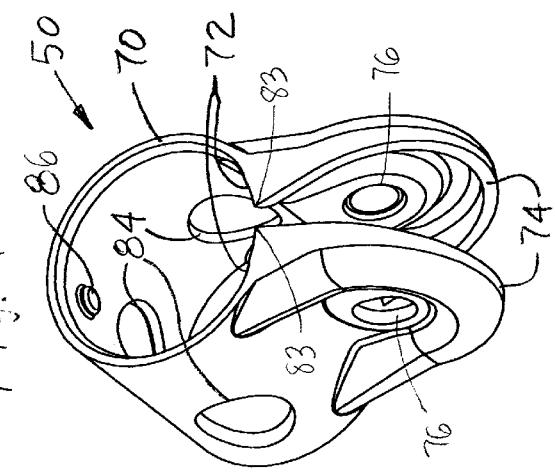

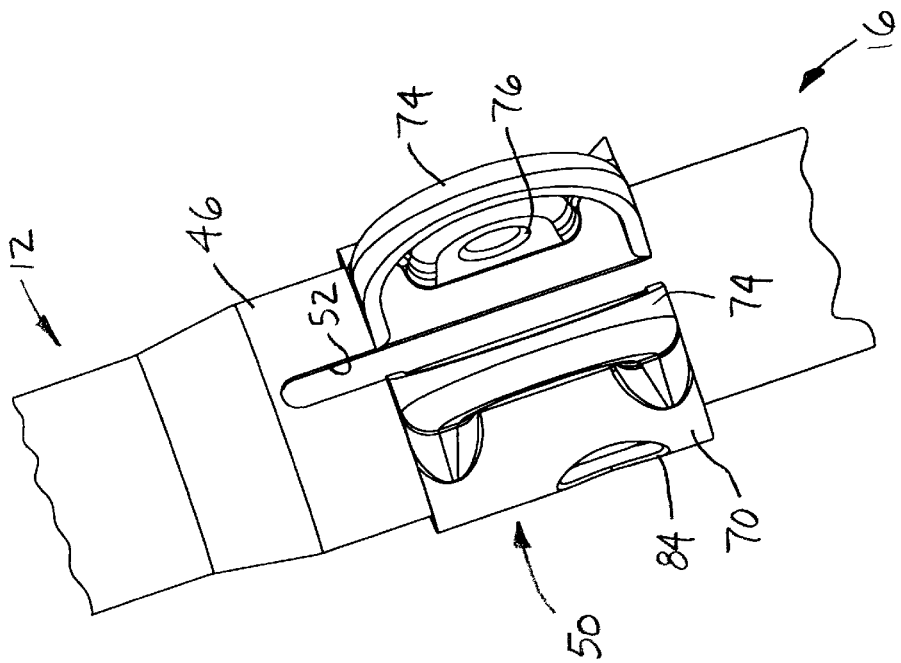
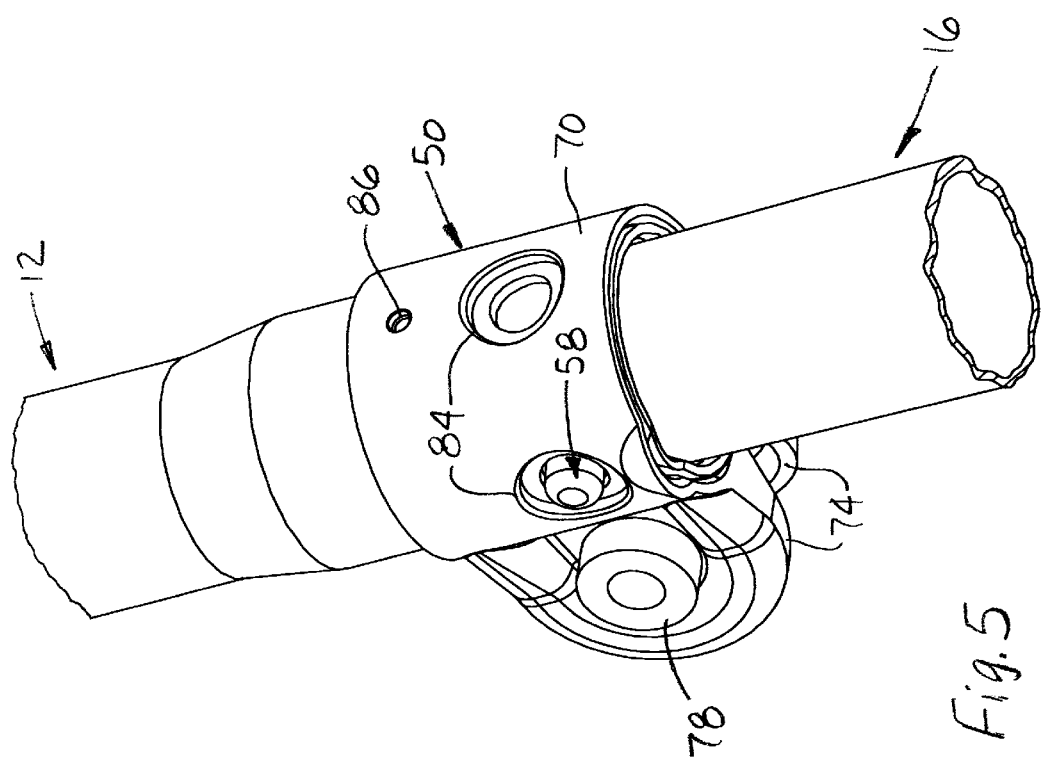

SPLIT BOOM COUPLING STRUCTURE

BACKGROUND OF THE INVENTION

1. Field of the Invention

The present invention relates to hand held portable power tools such as string trimmers and more specifically to a coupling structure for selectively attaching a lower boom section with any of a variety of work tools such as a trimmer, edger, blower, cultivator or brush cutter to an upper boom section having a power source such as a gasoline engine or electric motor.

2. Description of the Related Art

Those who provide lawn care services and others who maintain lawn, shrubs and trees frequently utilize hand held power tools such as string trimmers, edgers, blowers, brush cutters and cultivators. These hand held power tools typically include a gas engine or electric motor coupled to an elongated boom with the work tool at its opposite end. A flexible or solid shaft is driven by the engine or motor to rotatably power the work tool.

In the past, it has been necessary to purchase and maintain separate hand held power tools capable of performing each such type task. Recent developments in split boom tools have reduced the need to have separate power tools for each task by making the lower portion of the hand held tool detachable and providing multiple attachments with varied work tools that can be interchangeably used with a common upper boom and engine or motor. An example of the structures utilized which provide this capability can be found in U.S. Pat. No. 4,733,471.

Present split boom power tools typically provide for upper and lower boom sections that are separable in the midsection of the boom and for a flex drive shaft that can be easily disengaged and/or engaged when the boom sections are uncoupled or coupled. Their coupling structures utilize clamping sleeves into which the adjacent ends of the boom sections are inserted. A plurality of openings circumferentially spaced around the upper boom tube and clamping sleeve allow a locking pin to be variably positioned to orient the work tool, that is, the trimmer head, edger or blower at its proper angle with the upper boom for work. The clamping sleeve which secures the adjacent ends of the boom sections together is squeezed or tightened by the use of two or more screw type fasteners.

Present split boom coupling structures fail to provide for positive and easy positioning of the clamping structure and upper and lower boom members at the joint, telescopically joining of the upper and lower boom sections together or reinforcement of the coupling joint.

SUMMARY OF THE INVENTION

The present coupling structure overcomes these problems and provides for quickly and positively positioning the clamping structure through use of a locating tab on the clamping member that is receivable in a locating opening in the end portion of the upper boom section. As the tab positions the clamping structure with the upper boom member, it also aligns a plurality of tool orienting openings in the clamping structure with similar openings provided in the upper boom member. Further, an enlarged tubular cross section on the lower end of the upper boom section allows a comparatively smaller tubular end of the lower boom section to be quickly and easily positioned, inserted and joined together. Through telescopically joining and overlapping the adjacent ends of the upper and lower boom sections, the joint between them is thereby strengthened.

With the improved coupling structure, any of a variety of lower boom tools can be quickly, easily and positively attached with and aligned to the proper angular position with the upper boom section.

BRIEF DESCRIPTION OF THE DRAWINGS

FIG. 1 illustrates a split boom power tool with a separated lower boom having a blade edger.

FIG. 2 illustrates four types of lower boom tool attachments usable with the upper boom section, including a string trimmer in 2a, a blower in 2b, a brush prunner in 2c and a cultivator in 2d.

FIG. 3 illustrates an enlarged and exploded view of the coupling structure subject of the present invention.

FIG. 4 illustrates a prior art flex shaft drive arrangement usable with a split boom type of power tool.

FIG. 5 illustrates the coupling structure in its assembled configuration, absent the tightening hand screw.

FIG. 6 is similar to FIG. 5, but illustrates the coupling structure rotated slightly to illustrate the slot in the upper boom tube.

FIG. 7 illustrates an enlarged perspective view of the clamping member.

FIG. 8 illustrates an enlarged end view of the clamping member.

FIG. 9 illustrates another enlarged perspective and inside view of the clamping member and particularly the locating tab.

DESCRIPTION OF THE PREFERRED EMBODIMENT

Looking first to FIG. 1, there is illustrated a hand held portable power tool 10 of the split boom type. This tool 10 has a tubular upper boom member 12 equipped with a gas engine or electric motor 14 that is coupled with a second lower tubular boom member 16. The engine or motor 14 drivingly powers a flexible shaft 18 carried within the upper boom member 12. The shaft 18 extends through the upper boom member 12 and is disengageably coupled with a similar flexible drive shaft 20 provided in the lower boom member 16 to drivingly power a working tool such as a blade trimmer 22. The upper boom member 12 of this split boom tool includes a control module 24 depicted in the form of a box wherein conventional start, stop and engage controls would be provided. The upper boom member 12 further includes a hand grip 26 to help guide and control the tool 10. A coupling structure 28 is provided between the lower end of the upper boom member 12 and the upper end of the lower boom member 16 to allow the two boom members 12 and 16 to be quickly engaged, coupled and secured together or uncoupled and disengaged.

Looking now to FIG. 2, there is illustrated four of the types of lower boom attachments that could be selectively and interchangeably utilized with the upper boom member 12. FIG. 2a illustrates a string trimmer 30, FIG. 2b illustrates a blower 32, FIG. 2c illustrates a brush prunner 34 and FIG. 2d illustrates a cultivator 36.

As can be seen in FIG. 1, the upper or first boom member 12 is tubular in shape and form and includes first and second end portions 38, 40 with the upper end portion 38 being coupled to the engine or similar power source 14. The engine or power source 14 drivingly rotates the flexible shaft 18, see FIG. 1, that extends from the power source 14 and to the second or lower end portion 40 of the boom member 12. The second or lower tubular boom member 16 also includes first lower and second upper end portions 42, 44 with its lower end portion 42 rigidly coupled to a rotatable work device such as the blade trimmer 22 illustrated in FIG. 1. The blade trimmer 22 is drivingly coupled to the lower flex shaft 20, see FIG. 1, that extends to it from the upper or second end portion 44 of the boom member 16.

Looking now to FIG. 3, there is illustrated the improved coupling structure 28 for releasably joining the second end portions 40, 44 of the first and second boom members 12, 16. This coupling structure 28 includes an enlarged cross sectional configuration 46 provided on the lower or one second end portion 40 of the upper boom member 12. The enlarged section 46 is slightly greater in cross sectional configuration than that provided on the upper end portion 44 of the other or lower boom member 16. While the preferred embodiment has the enlarged cross sectional configuration provided on the upper boom member 12 and the smaller cross sectional configuration provided on the lower boom member 16, they could be reversed. This relative size differential allows the lower boom member 16 to be telescopically received in the enlarged portion 46 of the upper boom member 12. The assembled configuration, minus the hand tightening screw 48, is illustrated in FIGS. 5 and 6. To allow the enlarged cross section 46 of the upper boom member 12 to be compressed by a tubular clamping member 50, a slot 52 is provided. The slot 52 is illustrated in FIG. 3 in phantom and in solid lines in FIG. 6.

A plurality of circumferentially spaced apart orientation openings 54 are provided in the enlarged cross sectional configuration 46 of the second end portion 40 of the upper boom member 12. These openings 54 extend radially outwardly from the center of the tubular section. Three orientation openings 54 are provided in the preferred embodiment. Additionally provided in the enlarged cross sectional configuration 46 is an opening 56 that serves to locate the clamping member 50 relative to the upper boom member 12.

In the second or upper end portion 44 of the lower boom member 16, there is provided a locking pin 58 with a means biasing it 60 radially outwardly. In the preferred embodiment, the means biasing it 60 radially outwardly takes the form of a resilient spring member 62 that is secured to the inside of the tubular member, as by a rivet 64. As is illustrated in FIG. 3, the locking pin 58 takes the form of a small hub 66 that projects upwardly and through an opening 68 provided in the slightly smaller cross sectional configuration of the second end portion 44 of the lower boom member 16.

Continuing to look at FIG. 3, there is illustrated the tubular clamping member 50 which is C-shaped in form. This member 50 includes a C-shaped sleeve portion 70 that can be opened to a cross sectional configuration that is greater than the enlarged cross sectional configuration 46 of the lower or second end portion 40 of the upper boom member 12. This C-shaped sleeve portion 70 includes axially extending edges 72 to which are joined first and second radially extending flanges 74. As is best shown in FIG. 8, the flanges 74 extend outwardly from the edges 72 at an angle alpha that has its center or apex closely adjacent the inside circumference of the sleeve member 50. As can be seen from FIGS. 3 and 5–9, the flanges 74 are generally U-shaped with an opening 76 through their respective center portions. The opening 76 of one center portion is sized to receive a threaded nut 78 and secure it therein. The other opening 76 is slightly elongated and sized to permit free movement of a threaded shaft 80 carried on the tightening member 46 to permit it to be threaded into the nut 787 see FIG. 3. The tightening member 48 is provided with a thumb screw 82 that permits it to be easily rotated. with this structure, the tightening member 48 can be utilized to draw the two flanges 74 closer together to thereby reduce the interior dimension of the sleeve portion 70 while drawing the edges 83 of the sleeve 50 together to pinch those edges 83 tightly. Since the shaft 80 draws the flanges 74 together at a distance from the edges 83, the edges 83 will abut before the walls 85 of the flanges 74 meet to thereby tighten and enhance the compression of the sleeve 50 about the enlarged cross sectional configuration 46.

The sleeve portion 70 is further provided with a plurality of orientation openings 84 located circumferentially around and extending through it. These openings 84 are sized and located in a manner to be alignable with the plurality of orientation openings 54 in the second end portion 40 of the upper boom member 12 when the sleeve portion 70 has been placed around that second end portion 40. A locating tab 86 in the form of a small indentation punched through the wall of the sleeve portion 70 and projecting radially inwardly is provided, see particularly FIGS. 7, 8 and 9. This locating tab 86 is provided to permit the clamping member 50 to be positively located on the larger cross sectional configuration 46 of the one second end portion 40 when it is slipped over that end portion 40. When the locating tab 86 is positioned in the locating opening 56, the plurality of openings 84 provided in the C-shaped sleeve portion 70 are aligned with the plurality of openings 54 in the slightly larger cross sectional configuration 46 of the one end portion 40. In the preferred embodiment, the three circumferentially spaced openings 84 provided in the C-shaped sleeve portion 70 and the one second end portion 40 of the upper boom member 12 are provided at approximately 90 degree spacings from each other.

Looking now to FIG. 4, there is illustrated an enlarged and perspective view of a conventional prior art flexible drive shaft coupling typically used in split power boom type of power tools, such as is the subject of the present invention. As is shown therein, the upper boom member 12 would typically include an upper flex shaft 18 drivingly coupled with the engine or motor 14. The lower end of the flex shaft 18 has an axially slideable socket member 88 fixed to it. The lower boom member 16 would similarly include a flexible shaft 20 that would be drivingly coupled to the work tool such as the blade trimmer 22. To permit the lower and upper boom members 12 and 16 to be quickly and easily drivingly coupled, the lower flex shaft 20 has a squared off end section 90 that is compatibly shaped to be received in a square bore 92 of the socket member 88 carried at the end of the upper flex shaft 18. A biasing spring 94 is provided between the socket member 88 and the wall surface 96 of a washer 98 resiliently urges the socket member 88 into engagement with the squared off end section 90 of the flex shaft 20 when the upper and lower boom members 12 and 16 are engaged. In a reverse fashion, the sliding interaction between the upper and lower flex shafts 18 and 20 permits them to be easily disengaged as well.

In operation, the hand held portable power tool 10 subject of the present invention is used in a conventional fashion. However, the coupling structure 28 subject of the present invention permits the owner or operator to quickly and easily remove one lower boom member or attachment and substitute another as work tasks change and/or dictate. Should the operator want to change from the blade trimmer 22 illustrated in FIG. 1 to the string trimmer 30, the present coupling structure 28 would permit that removal of the blade trimmer attachment 22 through the following procedure. First, the operator would rotate the single tightening member 48 to release the pressure compressing the larger cross sectional configuration 46. After the clamping member 50 is loosened, the operator would depress the locking pin 58 by pushing against its upper surface to overcome the outwardly radially biasing force exerted by the leaf spring member 62, thereby permitting the lower boom portion 16 to be slideably and telescopically removed from the enlarged upper boom section 46. The locating tab 86 allows the clamping member 50 to remain in place on the boom member 12 when the lower boom attachments are interchanged. As the lower boom member 16 is removed from the upper boom member 12, the squared off end 90 of the lower flex shaft 20 would be withdrawn from the square bore 92 of the socket member 88 to disengage the two flex shafts 18 and 20.

To install another attachment tool such as a string trimmer 30, the operator telescopingly inserts the upper end portion 44 of the lower boom member 16 into the enlarged cross sectional configuration 46 of the upper boom member 12, see FIGS. 5 and 6, and the flex shaft members 18, 20 are easily and drivingly engaged. As the end portions 40 and 44 are joined, they overlap one another within the clamp 50 to provide a stronger joint. To select the angular orientation of the lower boom member 16 relative to the upper boom member 12, the operator depresses the locking pin 58 as he inserts the upper end portion 44 of the lower boom member 16 into the lower end 40 of the upper boom member 12 and angularly rotates the lower boom member 16 to the desired orientation with the upper boom member 12 appropriate for that particular attachment. For example, a blade trimmer 22 would be oriented with respect to the handle 26 of the upper boom member 12 in a fashion to allow the trimmer to run along the ground with the blade operating essentially about a horizontal axis. The desired angular orientation of the string trimmer 30 might be different depending on whether the operator wanted to use the trimmer in a horizontal or a vertical plane. With the circumferentially spaced apart openings 54 and 84 being 90 degrees apart, the angular orientation of the lower boom member 16 can be selectively chosen when the upper end portion 44 of the lower boom member 16 is inserted into the lower end portion 40 of the upper boom member 12. Accordingly, the operator would depress the locking pin 58 in the upper end portion 44 of the lower boom member 16 as he slides it into the sleeve portion 70 and larger cross sectional configuration 46 of the upper boom member 12 and then rotate the lower boom member 16 about its central axis to position that locking pin 58 within a selected set of openings 54 and 84 through the upper boom member 12 and the sleeve portion 70. The resilient spring 62 would urge the locking pin 58 up and through the holes 54, 84 to lock the lower boom member 16 in that particular angular orientation as is illustrated in FIG. 5.

With the present coupling structure, any of a variety of lower boom attachments with differing work tools can be quickly and easily attached to or detached from the upper boom member. The telescoping overlap between the upper and lower boom members serves to strengthen the joint between them. The locating tab and locating opening permit the clamping member to be quickly and positively located with the tool orienting openings aligned. The single stamped clamping member with the single tightening member reduces manufacturing expenses, eliminates the need for tools when installing or removing the various lower attachments and reduces the number of parts.

I claim:

1. A split boom power tool coupling structure for a split boom power tool having a first upper tubular boom member having first and second end portions, one end portion being operably coupled to a power source that drivingly rotates an upper flex shaft that extends from the power source and to the second end portion of the first boom, and a second lower tubular boom member having first and second end portions, one end portion being operably coupled to a rotatable work device that is drivingly coupled to a lower flex shaft that extends from the work device and to the second end portion of the second boom member, the coupling structure being adapted for releasably joining the second end portions of the first and second boom members together, the coupling structure comprising:

a cross sectional configuration provided on a first one of the second end portions that is slightly larger than the cross sectional configuration provided on a second one of the second end portions to allow the second end portions to be telescopingly joined together, the first one of the second end portions comprising a slot that permits the first one of the second end portions to be slightly compressed;

a tubular clamping member comprising:
a C-shaped sleeve portion with a cross-sectional configuration greater than the cross-sectional configuration of the one second end portion, said sleeve having first and second edges,
first and second radially extending flanges joined respectively to the first and second edges and movable between closer and spaced apart positions;
a locating tab extending radially inwardly from the sleeve portion that is removably receivable in a locating opening provided in the first one of the second end portions, and a tightening member coupled with the first and second flanges and effective to move them between their first and second positions.

2. A split boom power tool coupling structure for a split boom power tool having a first upper tubular boom member having first and second end portions, one end portion being operably coupled to a power source that drivingly rotates an upper flex shaft that extends from the power source and to the second end portion of the first boom, and a second lower tubular boom member having first and second end portions, one end portion being operably coupled to a rotatable work device that is drivingly coupled to a lower flex shaft that extends from the work device and to the second end portion of the second boom member, the coupling structure being adapted for releasably joining the second end portions of the first and second boom members together, the coupling structure comprising:

a cross sectional configuration provided on a first one second end portions that is slightly larger than the cross sectional configuration provided on a second one of the second end portions to allow the second end portions to be telescopingly joined together, the first one of the second end portions having a slot that permits the first one of the second end portions to be slightly compressed;

a plurality of circumferentially spaced apart openings extending around and through the first one of the second end portions;

a tubular clamping member comprising:
a C-shaped sleeve portion with a cross-sectional configuration greater than the cross-sectional configuration of the first one of the second end portions, said sleeve having first and second edges, first and second radially extending flanges joined respectively to the first and second edges and movable between closer and spaced apart positions;

a plurality of openings extending circumferentially around and through the sleeve portion and located to be aligned with the plurality of openings in the first one of the second end portions when the sleeve portion is placed around the first one of the second end portions, a locating tab extending radially inwardly from the sleeve portion that is removably receivable in a locating opening provided in the first one of the second end portions, a locking pin carried on the second one of the second end portions and sized to be received in one of the plurality of openings in the first one of the second end portions and the sleeve portion when the second one of the second end portions is telescopingly received within the first one of the second end portions and the sleeve portion, means biasing the locking pin radially outwardly from the center of the second one of second end portions; and a tightening member coupled with the first and second flanges and effective to move them between their first and second positions.

3. The invention defined in claim 2 wherein the first one of the second end portions is on the upper tubular boom member and the second one of the second end portions is on the lower tubular boom member.

4. The coupling structure as in claim 2 wherein the tightening member is a threaded fastener with a handle on one end.

5. The invention defined in claim 2 wherein there are three openings in the first one of the second end portions and three openings in the sleeve portion with the openings in each portion being spaced apart at approximately zero, ninety and one hundred eighty degrees so that they can be aligned when the sleeve portion is received around the larger cross sectional configuration of the first one of the second end portions.

6. A hand held portable power tool comprising:

a power source;

an upper boom member having a first end connected to the power source and an opposite second end; and a lower boom member having a third end removably connected to the second end of the upper boom member at a coupling, the coupling comprising;

the third end of the lower boom member being telescopingly received inside the second end of the upper boom member, wherein the second end of the upper boom member has a slot therein which is sized and shaped to allow the second end of the upper boom member to be resiliently compressed, and wherein the second end of the upper boom member has a locating opening therein; and a clamping system having a C-shaped sleeve and an inwardly projecting locating projection, wherein the C-shaped sleeve is located directly on the second end of the upper boom member at a location where the second end of the upper boom member overlaps the third end of the lower boom member, and wherein the projection extends into the locating opening of the second end of the upper boom member.

7. A hand held portable power tool as in claim 6 wherein the second end of the upper boom member further comprises a plurality of orientation openings therethrough.

8. A hand held portable power tool as in claim 7 wherein the orientation openings are spaced relative to each other at angles of about 90 degrees.

9. A hand held portable power tool as in claim 7 wherein the coupling further comprises a locking projection movably connected to the third end of the lower boom member and adapted to extend into one of the plurality of orientation openings in the second end of the upper boom member.

10. A hand held portable power tool as in claim 9 wherein the locking projection comprises a locking pin extending through a hole in the third end of the lower boom member and connected to the third end of the lower boom member by a spring.

11. A hand held portable power tool as in claim 6 further comprising a working tool connected to a fourth end of the lower boom member, wherein the upper boom member comprises a first flexible shaft extending therethrough from the power source to the second lower end thereof, and wherein the lower boom member comprises a second flexible shaft extending therethrough from the third end to the working tool at the fourth end, and wherein the first and second flexible shafts are removably connected to each other at the coupling.

* * * * *